United States Patent [19]
Conger, Sr.

[11] 3,884,869
[45] May 20, 1975

[54] COLORING SYSTEM FOR THERMOSETTING PLASTIC COMPOSITIONS

[75] Inventor: Joseph Clyde Conger, Sr., Somerville, N.J.

[73] Assignee: American Cyanamid Company, Stamford, Conn.

[22] Filed: Jan. 8, 1974

[21] Appl. No.: 431,799

[52] U.S. Cl.................. 260/38; 260/37 P; 260/391
[51] Int. Cl............................................. C08g 51/04
[58] Field of Search............ 260/39 P, 37 P, 391, 38

[56] References Cited
UNITED STATES PATENTS
2,542,544   2/1951   Loukomsky et al. ............... 260/391

OTHER PUBLICATIONS

E. N. Abrahart, Dyes and their Intermediates, 1968, p. 38; (TP910. A 3– copy in A.U. 145).

C. Ellis, Printing Inks: Their Chemistry and Technology, 1940, pages 158 & 234. (copy in A.U. 145).

Primary Examiner—Donald E. Czaja
Assistant Examiner—S. M. Person
Attorney, Agent, or Firm—John L. Sullivan

[57] ABSTRACT

In preparing a triphenylmethane dye by the oxidation reaction of three moles of aromatic amine with or without added formaldehyde, by-product formation occurs. The by-product of the reaction is a desirable colorant for thermosetting plastic compositions.

10 Claims, No Drawings

COLORING SYSTEM FOR THERMOSETTING PLASTIC COMPOSITIONS

This invention relates to a novel colorant for thermosetting plastic compositions. More particularly, this invention relates to certain by-product acridine dyes which range from brown to orange in color and are desirable colorants for phenolic and other thermosetting plastic compositions.

It is ofter desirable to color various thermosetting plastic compositions, such as phenol-formaldehyde resins, urea-formaldehyde resins, and melamine-formaldehyde resins. As a matter of preference, shades of brown to orange are frequently used to mask the inherent discoloration associated with the thermosetting plastics compositions upon curing the compositions to their thermoset state. For this purpose, a number of colorants have been proposed including inorganic pigments, such as the oxide of iron identified as burnt umber. Although burnt umber or a combination of burnt umber with one or more additional colorants are used in phenol-formaldehyde compositions, certain difficulties arise. Since burnt umber is derived from naturally occurring materials, variations in composition will vary from lot to lot. In order to obtain uniformity in results with respect to shade, depth of color and other properties as various lots are employed, it is necessary to modify individual lots so as to match the control standard.

To be suitable as a colorant in thermosetting plastics, certain requirements must be met. The coloring system should provide sufficient tinctorial power to afford various shades of dark brown color in the plastic composition. It must be readily dispersible throughout the plastic and result in a composition which is free from bleeding, blooming, and crocking deficiencies. For some purposes a high degree of light fastness is also required amd the coloring system should have sufficient heat stability to withstand the temperatures associated with processing thermosetting resins. For many applications, economic considerations generally dictate low costs for the colorants.

In accordance with the present invention, there is provided a brown to orange shade colorant for thermosetting plastic compositions, which colorant is the by-product obtained in the oxidative reaction of aromatic amines to form triarylmethane dyes.

In preparing the triarylmethane dyes, a total of three moles of one or more monocyclic aromatic armines of the general formula

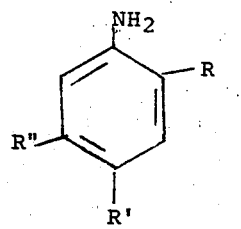

I wherein R and R'' are individually hydrogen or alkyl of one to two carbon atoms and R' is hydrogen or methyl are reacted under acidic conditions in the presence of an oxidizing agent and an oxidation catalyst with the following provisions:

1. when the three moles of amine individually selected contain R' as hydrogen one mole of formaldehyde is present to form the methane moiety;
2. when one of the three moles of amine individually selected contains R' as a methyl group, said methyl group forms the methane moiety; and
3. only one of the three moles of amine individually selected contains R' as a methyl group.

It is, of course, possible to use the same amine for each of the three moles required, but in such case the amine must be free of R' as a methyl group. Thus, one may select three moles of amines selected from the general formula

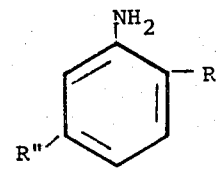

II wherein R and R'' are as previously defined, and carry out the reaction in the presence of one mole of formaldehyde to form the methane moiety to which the three amines attach. Conversely, one may select one mole of an amine of the structure

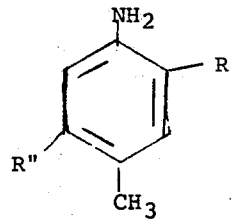

III wherein R and R'' are as defined above and two moles of an amine of structure II and carry out the reaction with the p-methyl group of the amine of structure III forming the methane moiety to which the other two amines attach. It is to be noted that the para positions of the amine attach to the methane moiety, which may be derived from added formaldehyde or from a p-methyl group on one of the moles of amine reacted. Thus, the para-positions of at least two of the three moles of amine reacted must be occupied by hydrogen and the third mole of amine, when substituted by other than hydrogen, must be substituted by methyl.

In carrying out the reaction, suitable oxidizing agents include oxygen and air. An oxidation catalysts, one may use those disclosed in U.S. Pat. No. 2,542,544, for example.

Representative of the monocyclic aromatic amines which may be employed in accordance with the present invention are aniline, ortho-toluidine, 2,5-xylidine, and the like. Although the three moles of amine may be reacted together in accordance with the invention, such reaction will generally give rise to a mixture of dyes. It is preferable, therefore, to react first two moles of aromatic amine with one mole of formaldehyde to form a diaminodiphenylmethane intermediate which is further reacted with another mole of aromatic amine to provide the triaminotriphenyl-methane dye. In the event a p-methyl substituted aromatic amine is employed as one of the moles of amine required, it should be reacted first with one mole of another amine free of para substitution and subsequently with a second mole of amine free of para substitution.

The reaction which produces the by-product colorant may be carried out in a variety of manners. However, the reactions are typical of those generally used in the production of dyes of the triphenylmethane class which includes Magenta, Fuchsin, Pararosaniline and the like. The conventional reactions have been described in various dye textbooks and issued patents, such as U.S. Pat. Nos. 471,638; 1,694,057; and 2,542,544. As indicated, the preferred reaction procedure involves stepwise substitution on a methane moiety. In such procedure, a substantial proportion of the product will be a valuable triphenylmethane dye and upon removal of such dye from the reaction product, there will remain the by-product which is itself a valuable colorant for thermosetting plastic compositions.

In the reactions for preparation of dyes of the triphenylmethane class, various side reactions occur and give rise to by-products which to some extent are of undetermined nature. However, the by-product may generally be identified as a member of the dye classes represented as acridine dyes, phenazine dyes, phenosafranine dyes, etc. The exact composition of the by-product colorant will vary depending upon the specific triphenylmethane dye prepared and the method of preparation thereof.

It is a particular advantage of the present invention that the process from which the by-product colorant is obtained primarily provides a substantial quantity of a desirable triphenylmethane dye, such as one of the Magenta or Fuchsin types. After removal of the bulk of the triphenylmethane dye, such as by extraction with hot water, the by-product residue remains. This residue generally is discarded. Depending upon the shade of color desired, however, a colorant of useful properties for thermosetting plastic compositions is now provided which consists essentially of the by-products obtained in preparing the triphenylmethane dyes. The by-product colorant may contain some of the triphenylmethane dye which constituted the primary purpose of the reaction but it is to be understood that by-product of itself is a valuable colorant in the use intended.

In a preferred process for preparing the triphenylmethane dye, two moles of an amine such as ortho-toluidine in the form of the hydrochloride salt are reacted with formaldehyde to form a diaminodiphenyl methane intermediate as the hydrochloride salt. Additional amine of suitable type is then added in an amount which is sufficient to satisfy the reagent requirements for conversion of the intermediate to the triphenylmethane product and to provide a solvent effect in the reaction. An oxidation catalyst is employed in conjunction with air flow through the reaction mixture in converting the intermediate to the triphenylmethane product. The proportion of isolatable pure triphenylmethane dye to by-product residue may be adjusted by varying the oxidation temperature, the time of reaction, the type of oxidation catalyst employed, and the usage level of catalyst.

In a typical preparation two moles of ortho-toluidine are converted to the hydrochloride salt by addition of two moles of hydrochloric acid thereto. With cooling, one mole of formaldehyde, as a 37 weight percent aqueous solution is added. After the reaction with formaldehyde is complete, the bulk of the reaction mixture consists of 4,4'-diamino-3,3'-dimethyldiphenylmethane dihydrochloride.

Aniline and additional hydrochloric acid are added, the aniline acting both as solvent and reactant in the subsequent oxidation reaction. The water of reaction and the water arising from the reagents employed are removed by heating the reaction mixture to about 140°C. An oxidation catalyst, as described in U.S. Pat. No. 2,542,544, is added, the temperature adjusted to 100° to 130°C., preferably about 100° to 120°C., and air, at approximately 60 cubic feet per minute, is blown through the solution over a 5 to 10 hour period. At the completion of the oxidation reaction, excess aniline is removed by steam distillation. Fuchsin, a desirable dye of the triphenylmethane class, is removed by extraction with hot water leaving the by-product colorant of the present invention.

The catalysts described in U.S. Pat. No. 2,542,544 are vanadium catalysts and a preferred catalyst described is the reaction product obtained by heating sodium metavanadate and acetic anhydride to a temperature above 100°C. These catalysts are generally more effective in providing the maximum yield of triphenylmethane dye and the minimum quantities of by-products than other catalysts types. While it is, of course, desirable to maintain a high yield and purity of the desired triphenylmethane dye, the present invention is contigent upon formation of at least some by-product in the reaction. Siince the by-product has now been shown to have a valuable utility, the yield of by-product colorant can be increased.

For application of the by-product colorant in thermosetting plastics, the colorant is generally converted into free base form. This is readily done by addition of sodium hydroxide solution which allows the by-product to be isolated.

A typical reaction sequence in preparing a triphenylmethane dye is represented by the following equations.

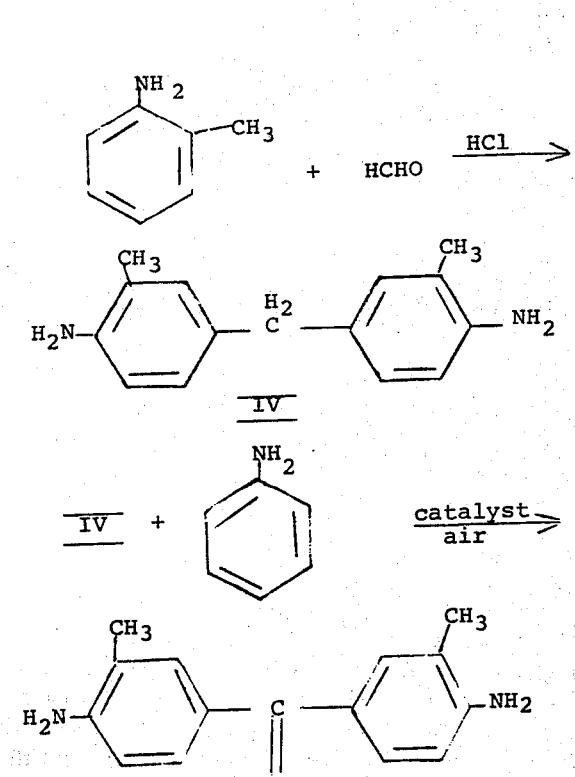

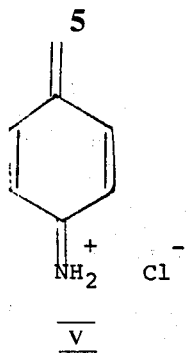

V

In the procedure illustrated ortho-toluidine is reacted with formaldehyde to prepare 4,4'-diamino-3,3-dimethyldiphenylmethane as intermediate. The intermediate is then subjected to the oxidation reaction with aniline to yield the desired dye product along with colorant by-product. Alternatively, one could use two moles of aniline in reaction with one mole of formaldehyde and carry out the oxidation reaction with aniline. Similarly, one could use two moles of ortho-toluidine to react with one mole of formaldehyde and then carry out the oxidation reaction with ortho-toluidine. A further alternative would involve reaction of two moles of 2,5-xylidine with one mole of formaldehyde and carry out the oxidation reaction with either aniline, ortho-toliudine, or 2,5-xylidine. Additional alternatives arise with other useful aromatic amines.

A particular advantage of the present invention is the use of a dye by-product, heretofore discarded, as a colorant for thermosetting plastic compositions with desirable results. Use of the dye by-product overcomes the ecological problems associated with discarding or burning the by-product.

In using the by-product colorant in thermosetting plastic compositions, from about 0.1 to about 3.0 weight percent, based on the weight of the plastic, of colorant is incorporated in the plastic by conventional means, such as by blending. The resulting blend is then molded at temperatures up to about 370°F. and at pressures of about 1,200 pounds per square inch or more.

The invention is more fully illustrated by the examples which follow wherein all parts and percentages are by weight unless otherwise specifically designated.

EXAMPLE 1

To 214 grams of technical grade ortho-toluidine were added with external cooling 232 grams of 31.4 percent hydrochloric while maintaining the temperature below 60°C. While maintaining the same temperature, 81 grams of aqueous formalin solution containing 30 grams of formaldehyde were added. After stirring the reaction mixture for about 1 hour, 1,500 grams of aniline and an additional 232 grams of 31.4 percent hydrochloric acid were added without the temperature control previously employed. The reaction mixture was then heated to 140°C. to distill out the water formed in the reaction.

A suitable amount of vanadium oxide type oxidation catalyst was then added along with sufficient aniline to replace that lost by distillation. The temperature was then adjusted to 110°C. and air was passed through the mixture by means of an inlet tube until maximum color formation occurs. With an air flow of about 60 cubic feet per minute, this required about 7 hours.

After the air oxidiation reaction was complete, the bulk of the unreacted aniline was removed by steam distillation. A tarry material dispersed in water arising from the steam distillation was obtained. This material consists of fuchsin dye as well as by-products of the reaction.

Two liters of water were added to the tarry dispersion. Such addition resulted in complete solution of the fuchsin dye and partial solution of the by-products. The pH of the solution was adjusted to pH 6.9 by addition of aqueous sodium hydroxide solution. At this pH, the fuchsin dye remained in solution while the by-products were present as a solid phase. The solution of fuchsin dye was separated from the solid-by-products by filtration. The fuchsin dye was salted out of the filtrate by addition of about 3 grams of sodidum chloride per 100 milliliters of solution. The fuchsin dye was then isolated by filtration giving a yield of 180 grams of fuchsin dyes.

The by-product residue was treated with two liters of water and sufficient sodium hydroxide to raise the slurry pH to 12. Under these conditions, the residue was converted to free base form and filtered, washed free of alkali, and dried. The product in the amount of 200 grams was the pulverized for use in thermosetting plastic compositions.

EXAMPLE 2

The procedure of Example 1 was followed in all material details except that 242 grams of 2,5-xylidine was substituted for the ortho-toluidine used in Example 1.

A fuchsin dye and by-product was obtained in substantially the same quantities as in Example 1.

EXAMPLE 3

The procedure of Example 1 was again followed in every material detail except that 186 grams of aniline was substituted for the ortho-toluidine used in Example 1.

Approximately 10 grams of fuchsin dye and 200 grams of by-product were obtained.

EXAMPLE 4

Again, the procedure of Example 1 was followed in every material detail except that the aniline and additional hydrochloric acid were added to the ortho-toluidine before the formaldehyde was added.

Approximately 170 grams of fuchsin dye and 200 grams of by-product were obtained.

EXAMPLE 5

The procedure of Example 4 was followed in every material detail except that 242 grams of 2,5-xylidine were substituted for the ortho-toluidine used in Example 4.

Approximately 100 grams of fuchsin dye and 200 grams of by-product were obtained.

EXAMPLE 6

The procedure of Example 1 was followed in every material detail except that 1,500 grams of ortho-toluidine were substituted for the aniline used in Example 1.

There were obtained approximately 205 grams of fuchsin dye and 180 grams of by-product.

EXAMPLE 7

The procedure of Example 2 was followed in every material detail except that 1,500 grams of 2,5-xylidene were substituted for the aniline used in Example 2.

There were obtained approximately 180 grams of fuchsin dye and 200 grams of by-product.

EXAMPLE 8

Into 100 grams of a phenol-formaldehyde resin were intimately mixed 0.5 gram of the dye by-product obtained in Example 1. The mixture was placed on the heated rolls of a two-roll mill and partially melted. The mixture was passed over the rolls three times to mix the colorant thoroughly in the resin. The resulting colored resin was allowed to cool and solidfy. The hard solid was then ground to a powder and molded at a conventional temperature to become a thermoset shaped article. A beautiful red brown colored plastic article was obtained.

EXAMPLE 9

The procedure of Example 4 is followed except that no formaldehyde is employed and in place of 107 grams of the ortho-toluidine there is employed 107 grams of 4-methylaniline. Essentially the same quantity of fuchsin dye and by product is obtained.

I claim:

1. A process for coloring a thermosetting plastic composition which comprises adding to said composition from about 0.5 to 3.0 weight percent, based on the weight of said composition, of the by-product obtained in the preparation of a triphenylmethane dye by reacting a total of three moles of one or more monocyclic aromatic amines of the general formula

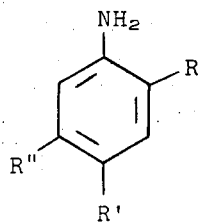

wherein R and R'' are individually hydrogen or alkyl of one to two carbon atoms and R' is hydrogen or methyl, said reaction being carried out under acidic conditions in the presence of an oxidizing agent and an oxidation catalyst with the following provisions:
   1. when the three moles of amine individually selected contain R' as hydrogen, one mole of formaldehyde is present to form the melamine moiety;
   2. when one of the three moles of amine individually selected contains R' as a methyl group, said methyl group forms the methane moiety; and
   3. only one of the three moles of amine individually selected contains R' as a methyl group; said by product being the residue remaining after removal of the triarylmethane dyes from the dye product produced in said preparation.

2. The process of claim 1 wherein the three moles of amine individually selected contain R' as hydrogen and one mole of formaldehyde is present to form the methane moiety.

3. The process of claim 1 wherein one of the three moles of the three moles of amine individually selected contains R' as a methyl group and said methyl group forms the methane moiety.

4. The process of claim 2 wherein the three moles of amine consist of two moles of ortho-toluidine and one mole of aniline.

5. The process of claim 2 wherein the three moles of amine consist of two moles of 2,5-xylidine and one mole of aniline.

6. The process of claim 2 wherein the three moles of amine consist of aniline.

7. The process of claim 2 wherein the three moles of amine consist of 2,5-xylidene.

8. The process of claim 2 wherein the three moles of amine consist of 2,5-xylidene.

9. The process of claim 3 wherein the three moles of amine consist of one mole of 4-methyl aniline, one mole of ortho-toluidine and one mole of aniline.

10. A plastic composition obtained by the process of claim 1.

* * * * *